United States Patent [19]

Suzuki et al.

[11] 4,269,498
[45] May 26, 1981

[54] ACCESSORY DEVICE FOR PHOTOGRAPHIC CAMERA

[75] Inventors: Yoshiki Suzuki, Tokyo; Seijiro Noda, Yokohama, both of Japan

[73] Assignee: Nippon Kogaku K.K., Tokyo, Japan

[21] Appl. No.: 29,463

[22] Filed: Apr. 12, 1979

[30] Foreign Application Priority Data

Apr. 14, 1978 [JP] Japan ............................. 53-49210[U]

[51] Int. Cl.³ ............................................. G03B 17/02
[52] U.S. Cl. ................................. 354/288; 354/173; D16/1; D16/44
[58] Field of Search ......... 354/288, 293, 82, 170-173; D16/1-10, 44-47, 83; 352/243

[56] References Cited

U.S. PATENT DOCUMENTS

| D. 236,914 | 9/1975 | Matsumoto | D16/4 |
|---|---|---|---|
| D. 244,022 | 4/1977 | De Filippis | D16/10 |
| D. 244,686 | 6/1977 | Hansen | D16/1 X |
| D. 247,244 | 2/1978 | Mazur | D16/44 |
| D. 247,568 | 3/1978 | Miller et al. | D16/4 |
| D. 250,198 | 11/1978 | Emmerling | D16/6 |
| 3,519,341 | 7/1970 | Dudley | 352/243 |
| 4,138,045 | 2/1979 | Baker | 354/288 X |

FOREIGN PATENT DOCUMENTS 940621 3/1956 Fed. Rep. of Germany .......... 352/243

Primary Examiner—S. J. Witkowski
Assistant Examiner—Shelley Wade
Attorney, Agent, or Firm—Fitzpatrick, Cella, Harper & Scinto

[57] ABSTRACT

An accessory device to be mounted onto the bottom surface of a camera main body in a general configuration having extended portions at both right and left sides of the lens mounting section. The device has a fitting surface to the camera main body, which is substantially same in shape as the bottom surface of the camera main body, and front and rear wall surfaces which are contiguous to the front and rear surfaces of the camera main body and inclined frontward of the camera main body.

3 Claims, 3 Drawing Figures

ACCESSORY DEVICE FOR PHOTOGRAPHIC CAMERA

BACKGROUND OF THE INVENTION

This invention relates to an accessory device for a photographic camera such as, for example, a motor drive device, etc. to be attached to the bottom part of the camera main body.

The main body of the photographic camera generally takes such a shape that the front and rear faces thereof are substantially perpendicular to the optical axis of a photo-taking lens of the camera, and both left and right sides or either one of them extends in the lateral or breadthwise direction from a lens-mounting portion for fitting thereon the photo-taking lens so as to provide a hand-gripping portion for firmly holding the camera main body at the time of the photo-taking operation.

When the photo-taking operation is to be conducted using the camera of such general configuration without attaching the accessory device such as the motor drive device, etc. onto the bottom surface of the camera main body, a photographer firmly holds the camera main body by clamping its extended portions with his (or her) thumb, its base and neighboring palm, and remaining fingers, and brings his eye close to the view-finder eyepiece of the camera for the taking action. When the camera is thus held close to the photographer's eye with the camera being directed toward a photographic object, it is natural for the palm portion ranging from the vicinity of the base of the thumb up to the wrist to face the front upper diagonal direction of the camera.

In case no accessory device is mounted on the camera main body, as mentioned above, a part of the palm juts out below the bottom surface of the camera main body, and the photo-taking operation can be carried out with the camera being held in a natural posture, i.e., with the bottom surface at the rear surface side of the camera main body being supported by the palm portion facing toward the front upper diagonal direction of the camera.

On the other hand, when an accessory device of conventional type is mounted on the bottom surface of the camera main body, the rear surface of the camera main body and that of the accessory device fall in one and the same plane which is perpendicular to the optical axis of the photographic lens. Accordingly, when the photo-taking operation is conducted by bringing the camera, the height of which has effectively been increased with mounting of the accessory device, close to the photographer's eye, the palm portion of the photographer's hand does not jut out of the bottom surface of the camera main body with the consequence that the photographer is obliged to hold both side ends of the main body in the state of the entire palm portion being perpendicular to the optical axis of the photographic lens. In other words, the photographer is compelled to hold the camera in an unnatural posture, which is very inconvenient.

SUMMARY OF THE INVENTION

It is an object of the present invention to provide an accessory device for the photographic camera, improved in its configuration and which is more convenient than the conventionally shaped device for in holding the photographic camera, the height of which has been effectively increased by attachment of such conventional accessory device onto the bottom surface of the camera main body, thereby removing the abovementioned defect.

The present invention attains the abovementioned object by constructing the accessory device in such a manner that, when it is mounted on the bottom surface of the camera main body, the rear surface of the accessory device may be inclined forwardly of the camera main body.

DETAILED DESCRIPTION OF THE PREFERRED EMBODIMENTS

In the following, the present invention will be described in specific detail with reference to the accompanying drawing.

It should be noted that the following explanations of the embodiments according to the present invention will be made with reference to a photographic camera, onto which a motor drive device is mounted as the accessory device.

Figure 1:
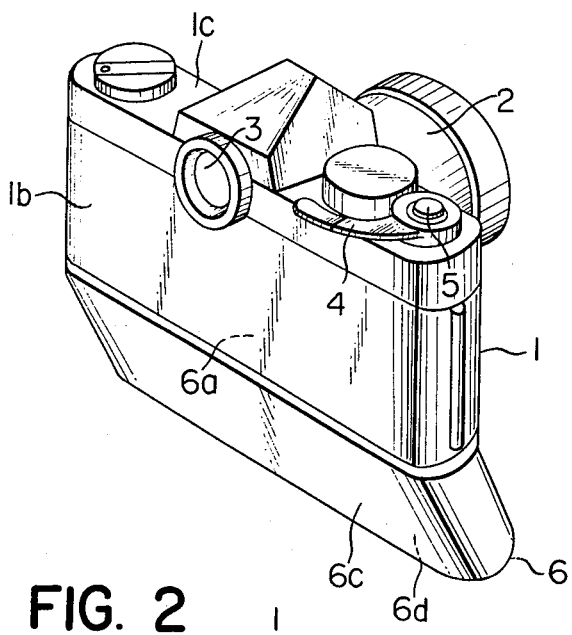
FIG. 1 is perspective view of one embodiment of a photographic camera according to the present invention, as seen from its rear side, with an accessory device mounted on its bottom surface.
Figure 2:
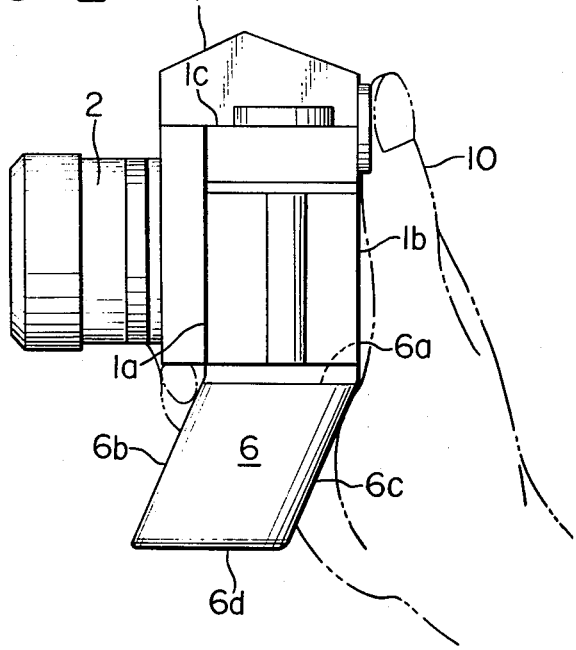
FIG. 2 is a side elevational view of the camera shown in FIG. 1.

Referring first to FIGS. 1 and 2 showing the first embodiment of the present invention, the main body 1 of the photographic camera is of a known general configuration having extended portions on both right and left sides of a lens mounting portion where a lens 2 is mounted. The front wall surface 1a and the rear wall surface 1b of the camera main body lie in respective planes which are substantially perpendicular to the optical axis of the lens. A viewfinder eyepiece 3 is provided on the top rear part 1b of the camera main body. On the top surface 1c of this camera main body 1, there are provided a film winding lever 4, a shutter button 5, and so forth, whereby manual film wind-up operation and shutter release operation can be effected.

A motor drive device 6 which is detachably mounted on the bottom surface of the camera main body 1 includes a motor and a battery (neither of which are shown) to drive a film winding mechanism (not shown) of the camera main body 1, and drives the camera by that motor in association with operation of the shutter button 5 provided in the camera main body.

The top surface 6a of this motor drive device, i.e., the surface thereof to be mounted onto the camera main body 1, is substantially the same in contour as the bottom surface of the camera main body 1. Also, this motor drive device 6 is in such a shape as shown in the drawing that its front surface 6b and its rear surface 6c take a forward inclination of about 10° to 15° with respect to a plane perpendicular to the top surface 6a, so that the front face 6b protrudes forwardly and downwardly and the rear surface 6c extends forwardly and downwardly of the rear surface of the camera body from the front surface of the camera body. In the illustrated embodiment, the rear surface 6c is shown to be flat, although it may of course be curved. Further, the bottom surface 6d of this device 6 is so formed that it may constitute a plane substantially perpendicular to the planes of the front and rear surfaces 1a, 1b of the camera main body.

Since the accessory device to be mounted onto the bottom surface of the camera main body according to the present invention is in such a configuration as mentioned above, a photographer may place his right thumb 10 and its base on the rear surface 1b on the right end part of the camera main body 1, his right index finger on the shutter button 5, and the remaining fingers on the front surface 1a of the camera main body, while his palm portion ranging from the vicinity of the thumb base to the wrist is placed on the rear surface 6c of the motor drive device 6 which is contiguous to the rear surface 6c of the camera main body.

In this manner, the photographer is able to hold the right end part of the camera main body. The left palm and fingers can also be placed on the left end part of the camera main body in the same manner as the right palm and fingers. Accordingly, when the photographer holds the camera as such and brings the view-finder eyepiece 3 close to his eye, the palm portion extending from vicinity of the thumb base to the wrist becomes inclined to face the front upper diagonal direction of the camera following the shape of the rear face 6c of the motor drive device, whereby the camera can be held in a natural posture. Also, since the weight of the camera can be received and sustained by the palm portion, it is possible to hold the camera stably.

According to the above-described first embodiment, when the motor drive device is mounted onto the bottom surface of the camera main body, the rear surface 6c of the motor drive device is inclined forwardly of the camera main body, hence the bottom surface 6d of the motor drive device is positioned to protrude from the front surface of the camera main body more eminently than the conventional ones. As the result, the camera can maintain its stability, even when it is placed on the desk, etc. with the lens being fitted on the camera main body, and with the bottom surface 6d of the motor drive device facing downwardly. In this embodiment, however, an acute angle is formed by the front surface 6b and the bottom surface 6d of the motor drive device, which gives rise to some inconvenience when the photographer stretches his left hand toward the lower surface of the lens 2 passing underneath the motor drive device to hold the lower peripheral surface of the lens barrel or to manipulate the aperture ring or distance ring around the lens barrel 2.

Figure 3:
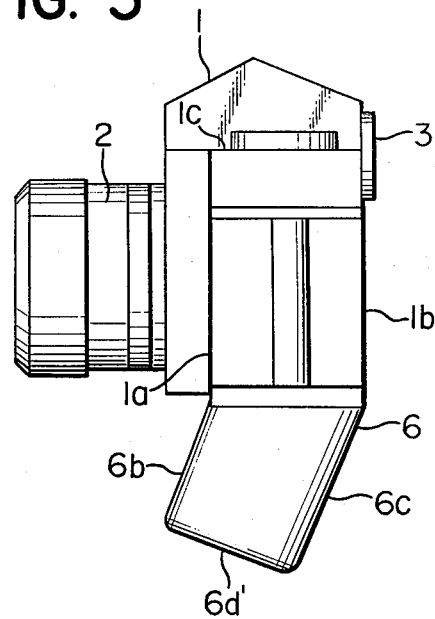
FIG. 3 is a side elevational view of a second embodiment of the photographic camera according to the present invention.

The second embodiment shown in FIG. 3 solves this problem, according to which the bottom surface 6d' of the motor drive device is so made that it inclines upwardly and forwardly of the front side of the camera main body. In so designing the bottom surface of the motor drive device, the angle formed by the front surface 6b and the bottom surface 6d' is substantially a right angle, not the acute angle as in the previous embodiment, so that the manipulation of various adjusting rings around the lens barrel is facilitated. The other constructions of the accessory device in this embodiment are the same as in the first embodiment, hence detailed explanations will be dispensed with.

The motor drive devices which have so far been described are detachably mounted on the bottom surface of the camera body. However, it is, of course, possible that the motor drive device be fixedly secured to the bottom surface of the camera main body, i.e., it may be fixedly provided as an integral part of the camera main body.

When the motor drive device is fixedly mounted on the camera main body as mentioned above, there is no necessity for providing the film winding lever on the camera main body.

So far, explanations have been given with reference to the motor drive device including a motor and battery, as the accessory device. It should, however, be understood that, when the motor is incorporated in the camera main body or in front of it, and a battery case alone is mounted on the bottom surface of the camera main body, this battery case constitutes the accessory device. It should also be understood that this accessory device is not necessarily limited to the abovementioned devices, but any other kinds of devices may replace them.

As stated in detail in the foregoing, according to the present invention, when the accessory device is mounted on the bottom surface of the camera main body having a general contour, the rear surface of the accessory device assumes a state, in which it is inclined forwardly of the camera main body. Therefore, the photographer can hold the camera in a natural posture by placing his palm ranging from the base of the thumb to the wrist on this inclined surface and bringing the camera view-finder eyepiece closer to his eye. With such shape of the accessory device, the camera can be held very easily by the photographer. In addition, since the weight of the camera can be supported by the palm portion, it can be more stably held in the photographer's hands.

We claim:

1. An accessory device for use with a photographic camera, said camera comprising:
    (a) a photo-taking lens;
    (b) a camera body having a portion for mounting said photo-taking lens, a front surface formed substantially perpendicular to the optical axis of said photo-taking lens and a rear surface formed substantially parallel to said front surface, the distance between the front surface and the rear surface being less than the height of the camera body;
    said front and rear surfaces extending laterally from said lens mounting portion to constitute gripper portions for holding the camera at the time of the photographic operation, said camera body further having an operating portion provided at the upper portion of at least one of said gripping portions and a viewfinder eyepiece provided in said rear wall surface;
    said accessory device having a rear wall surface contiguous to and substantially the same lateral length as that of said rear surface, and a front wall surface substantially parallel to said rear wall surface, said rear wall surface being inclined forwardly and downwardly of said camera body with respect to said rear surface, said accessory device further having a bottom wall surface formed substantially parallel to said optical axis.

2. In a motor drive device to be mounted on the bottom of a photographic camera which camera comprises a portion for mounting a photo-taking lens, a front surface substantially perpendicular to the optical axis of said lens and a rear surface substantially parallel to said front surface, said front and rear surfaces extending laterally from said lens mounting portion to constitute gripping portions for holding the camera at the time of the photographic operation, the distance between the front surface and the rear surface being less than the height of the camera, an operating portion provided at the upper portion of at least one of said gripping portions, and a viewfinder eyepiece provided in said rear surface, the improvement comprising:

(a) a rear wall surface of said motor drive device arranged to be contiguous to said rear surface when the motor drive device is mounted on the camera, the rear wall surface having substantially the same lateral length as that of said camera and being inclined forwardly of said rear surface of said camera with respect to said rear surface;

(b) a front wall surface substantially parallel to said rear wall surface; and (c) a bottom wall surface formed substantially parallel to the optical axis.

3. An accessory device for use with a photographic camera said camera comprising:

(a) a photo-taking lens;

(b) a camera body having a portion for mounting said photo-taking lens, a front surface formed substantially perpendicular to the optical axis of said photo-taking lens and a rear surface formed substantially parallel to said front surface;

said front and rear surfaces extending laterally from said lens mounting portion to constitute gripper portions for holding the camera at the time of the photographic operation, said camera body further having an operating portion provided at the upper portion of at least one of said gripping portions and a viewfinder eyepiece provided in said rear wall surface;

said accessory device having a rear wall surface contiguous to and substantially the same lateral length as that of said rear surface, and a front wall surface substantially parallel to said rear wall surface, said rear wall surface being inclined forwardly and downwardly of said camera body with respect to said rear surface, said accessory device further having a bottom wall surface formed substantially perpendicular to said front and rear wall surfaces.

* * * * *